3,123,572
POLYMERIZATION CATALYST
Daniel F. Herman, Orange, N.J., and Robert C. Kollman, Rockville Centre, N.Y., assignors to National Lead Company, New York, N.Y., a corporation of New Jersey
No Drawing. Original application Dec. 16, 1957, Ser. No. 702,818, now Patent No. 3,078,262, dated Feb. 19, 1963. Divided and this application Mar. 1, 1960, Ser. No. 11,954
6 Claims. (Cl. 252—431)

This invention relates to an improved method for polymerization of olefinically-unsaturated monomers and to catalyst systems useful in carrying out such polymerization.

The polymerization of olefinically-unsaturated compounds, particularly ethylene, propylene, styrene, and the like, has occupied the attention of polymer chemists for some time and has been productive of a host of useful and popular polymeric products. A recent development in the field has been the introduction of a new type of catalyst system which permitted the polymerization to be carried out at low temperature and, in the case of volatile monomers such as ethylene, at low pressures as well. Previous methods had required the use of exceedingly high pressures, of the order of 30,000 lb./in.$^2$. The product of the new process was also characterized by improved properties such as higher melting and softening points.

In general, the improved catalyst system referred to was characterized by the presence of organometallic compounds of transition metals. Such organometallic transition metal compounds could be prepared separately or produced in situ, as by the simultaneous use of a transition metal compound and an organometallic compound of another metal (e.g., a Grignard reagent, aluminum alkyl, lithium alkyl or aryl, cadmium alkyl or aryl, etc.) which would react in the mixture to produce the corresponding organometallic compound of the transition metal.

The principal object of this invention is to provide an improved method for the polymerization of olefinically-unsaturated monomers. Another object is to provide an improved catalyst useful in the polymerization of olefinically-unsaturated monomers. Another object is to provide a method as aforesaid, which results in improved yields of polymer. Other objects and advantages will become more apparent from the following more complete description and claims.

Broadly, this invention contemplates a method for polymerizing an olefinically-unsaturated compound selected from the group consisting of ethylene, styrene and alkyl-substituted styrenes, which comprises the steps of maintaining said compound in contact with a catalyst mixture comprising an organometallic compound of a transition metal selected from the group consisting of titanium and zirconium and an amine selected from the group consisting of secondary and tertiary aliphatic, aromatic and cyclo-aliphatic amines, thereby polymerizing said monomer, and subsequently separating the resulting polymer from spent catalyst, excess catalyst and unreacted monomer.

This invention also contemplates a catalytically-active composition of matter comprising an organometallic compound of a transition metal selected from the group consisting of titanium and zirconium and an amine selected from the group consisting of secondary and tertiary aliphatic, aromatic and cyclo-aliphatic amines.

The catalytic compositions of this invention appear to be specific to certain olefins, as recited above. Thus, while they are effective in improving the reaction rates and yields in the polymerization of ethylene, they are ineffective to assist the polymerization of propylene under the same conditions. Similarly, they enhance the polymerization of styrene and alkyl-substituted styrenes such as alpha-methyl styrene, but are ineffective in the polymerization of isoprene, chloroprene and similar closely-related compounds.

The transition metal also appears to be quite specific. Organometallic compounds of titanium and zirconium exhibit the beneficial effects forming the objects of this invention, whereas we have detected no evidence of similar effects using compounds of hafnium and cerium.

The transition metal must be present, at the time when its catalytic activity is needed, in the form of an organometallic compound, i.e., a compound containing an organic moiety which is linked to the transition metal by a direct metal-to-carbon bond. The organic moiety may be alkyl or aryl, and may be substituted or not; the nature of the organic moiety, as such, does not appear to affect greatly the course of reaction nor the behavior of the catalyst, and it is therefore believed that the catalytic effect is directly attributable to the presence of the carbon-metal bond. Among the varied organic moieties that have been found operable according to this invention are methyl, ethyl, indenyl, phenyl, etc.

As noted above in connection with the basic process of which this is an improvement, the organometallic transition metal compound may be added as such or prepared in situ in the reaction mixture. Preparation in situ is accomplished by incorporating into the reaction mixture a transition metal compound and an organometallic compound capable of reacting to form an organometallic compound of the transition metal. Obviously, a wide choice of reactants exists. Thus, the transition metal (titanium or zirconium) may be introduced in the form of a halide, oxychloride, alkylate, mixed halide-alkylate, or the like, while the organic moiety may be supplied by a Grignard reagent, alkyl or aryl-lithium, alkyl or arylzinc, alkyl or arylcadmium, alkyl or arylmercury, etc. Substantially any combination of transition metal compounds and organometallic compounds from the above tabulation will react to form an organometallic compound of titanium or zirconium, as the case may be, and hence will exhibit catalytic activity. Among the preferred combinations, however, is that of a titanium or zirconium halide, such as the respective tetrachloride, with an alkyl Grignard reagent such as methyl or ethyl magnesium bromide.

An important novel feature of the present invention is the employment, in the catalyst system, of a secondary or tertiary aliphatic, cycloaliphatic, or aromatic amine. The mechanism by which the amine assists the reaction is not established, and no theory has been advanced which satisfactorily accounts for the beneficial results obtained by the incorporation of such an amine into the system. Nevertheless, it has been found that the use of an amine results consistently in good yields of polymer under less stringent reaction conditions, or alternatively, greater yields under the same reaction conditions than can be achieved without it. The amine employed may be alkyl or aryl, and may be cyclic or not. The preferred amines, however, are diphenylamine the heterocyclic tertiary amines such as pyridine, etc.

The ratio of the amine to the organometallic transition metal compound may vary widely. It is preferred, however, to employ between .05 and 2 gram-mols of amine for each gram-atom of the transition metal employed. Higher amounts of amine are undesirable because the yield is not increased in proportion to the amount of amine used. Lower amounts of amine, on the other hand, are undesirable because they are insufficient to confer any noticeable beneficial effect.

Contacting the monomer with the catalyst may be accomplished in a variety of ways, as will be obvious to those skilled in the art. Preferably, the catalyst system is used in the form of a slurry in a suitable inert liquid such as benzene, heptane, or the like. The monomer will normally be either a gas or a liquid, depending, in the case of ethylene, on the operating pressure and temperature employed. If a gas, e.g., ethylene, the monomer is preferably bubbled through the liquid catalyst system. In the case of a liquid, e.g., styrene or alkyl-substituted styrene, it is simply added to the liquid (or solid) catalyst mixture and stirred.

The pressure and temperature conditions may be varied over a wide range. In general, higher pressures and temperatures are accompanied by more complete and efficient reaction. However, the reaction proceeds effectively at room temperature and atmospheric pressure, and the economy of operating in this fashion may more than offset the increased efficiency available at higher temperatures and pressures. The only upper temperature limit is imposed by the catalyst, the activity of which is impaired above 150° C. Preferably, it is usually desirable to operate at temperatures not exceeding 100° C. There is no maximum pressure other than that imposed by equipment limitations.

In order to illustrate more fully the nature of this invention and the manner of practicing the same, the following examples are presented:

Example I

Into a dry nitrogen filled Pyrex liner for an Aminco pressure autoclave was added 7.5 g. of 60% $ZrCl_4$-mineral oil paste containing 0.0195 mol of $ZrCl_4$, and 700 ml. of benzene. With agitation provided by a magnetic stirrer and under a nitrogen atmosphere, 0.725 g. (0.0048 mol) of diphenylamine was added followed by the addition of 25 ml. of a 1.75 normal methyl-magnesium bromide Grignard solution (0.0438 mol). The mole ratio of $ZrCl_4$ to diphenylamine was 1:¼. The Pyrex container was placed in the autoclave which had been pre-heated overnight to an equilibrium temperature of 40° C. The latter was sealed and connected to the gas inlet and outlet lines. The system was then evacuated to approximately 80 mm. Hg and, with agitation started, ethylene was passed in at a rate of approximately 800 ml. per minute. The pressure of ethylene was maintained between approximately 130 and 140 lbs. per square inch by alternatively opening and closing the gas inlet valve. No additional heat was added to the system, above that required to maintain the 40° C. equilibrium temperature. Periodic temperature readings were taken during the four-hour run. A 36° C. increase in temperature above the initial temperature was recorded. This was 10° C. more than the maximum temperature rise of the control (see below). The polyethylene product was recovered by treating the reactants with methanol, filtering and drying. A yield of 93 grams was obtained, which is equal to 12.4 lbs. of polyethylene per gram mole of zirconium.

By way of comparison, a similar run was made as a control, under the same reaction conditions, and using the same amounts of reactants and solvents, but an amine was not incorporated anywhere in the reaction. An increase in temperature of 26° C. above the initial temperature was recorded. A yield of 71.5 grams of polyethylene was obtained, which is equal to only 7.9 lbs./gram mole Zr.

Example II

The procedure of Example I was repeated using 6.5 g. of a 60% $ZrCl_4$-mineral oil paste containing 0.0165 mol of $ZrCl_4$. One ml. of tri-n-butylamine was added just prior to the addition of the Grignard solution. The mole ratio of $ZrCl_4$ to tri-n-butylamine was 1:¼. An increase in temperature of 31° C. above the initial temperature was recorded. The yield of polyethylene obtained was equal to 9.56 lb. per gram mole of zirconium.

Example III

The procedure of Example I was repeated using a catalyst comprising 1.8 ml. of $TiCl_4$ (0.0165 mol of $TiCl_4$). 0.35 ml. (0.0044 mol) of pyridine was added just prior to the addition of the Grignard solution. The yield of polymer obtained was equal to 9.15 lbs. per gram mole of titanium.

By way of comparison, a similar run was made as a control, under the same reaction conditions and using the same amounts of reactants and solvents, but an amine was not incorporated anywhere in the reaction. The yield of polymer obtained was equal to only 8.62 lbs. per gram mole of titanium.

Example IV

Into a nitrogen filled flask was put 3.1 g. of 60% $ZrCl_4$-mineral oil paste containing 0.008 mol of $ZrCl_4$, and 70 ml. of benzene. Ethylene was passed into the slurry below the liquid surface and the reaction mixture was agitated. 0.15 ml. of pyridine (0.002 mol) was added and, with agitation containing, 5 ml. of 3.18 normal methyl magnesium bromide solution (0.016 mol) was also added. The ratio of $ZrCl_4$ to pyridine was 1:¼. Excess ethylene was passed through the reactants for two hours. The product was recovered by treatment with methanol, filtering, and drying. The yield of polyethylene was equal to 1.12 lbs. per gram mole of zirconium.

By way of comparison, a similar run was made as a control under the same reaction conditions and using the same amounts of reactants and solvents, but an amine was not incorporated anywhere in the reaction. The yield of polyethylene was equal to 0.275 lb. per gram mole of zirconium.

Example V

The preparation of Example IV was repeated, but 0.30 ml. of pyridine (0.004 mol) was used. The mole ratio of $ZrCl_4$ to pyridine was 1:½. The yield of polyethylene was equal to 0.825 lb. per gram mole of zirconium.

Example VI

The preparation of Example IV was repeated, but 1.2 ml. of pyridine (0.016 mol) was used. The mole ratio of $ZrCl_4$ to pyridine was 1:2. The yield of polyethylene was equal to 0.331 lb. per gram mole of zirconium.

Example VII

To a dry nitrogen filled flask equipped with a stirrer was added respectively 250 ml. of n-heptane, 10 millimols of $ZrCl_4$ (4 g. of 60% paste in mineral oil), 2.5 millimols of pyridine (0.2 ml.), 20 millimols of methylmagnesium bromide solution, and one mole of styrene (94 ml.). The mixture was heated to 80° C. and agitated for 4 hours. The product was precipitated by the addition of methanol. The yield was 73 grams of polystyrene.

Similar runs without the pyridine failed to yield a product upon the addition of methanol.

Example VIII

The preparation of Example VII was repeated, but in place of one mole of styrene, was substituted one mole (118.17 grams) of alpha-methyl styrene. The yield of polymer was 82.7 grams.

This novel method for the polymerization of olefinically-unsaturated monomers has numerous advantages over other methods to produce the desired result. Using this method, it is no longer required to use exceedingly high pressure, which of necessity required specialized expensive equipment. The novel catalyst employed here results in improved yields of the polymer. It is not critical that the catalyst be employed utilizing greater than atmospheric pressure, but pressures greater than atmospheric pressure resulted in still higher yields of the polymer.

This method is a simple one and can readily be carried out by the operator without any special skill or training.

While this invention has been described in terms of certain preferred embodiments and illustrated by means of specific examples, these are illustrative only, and the invention is not to be construed as limited, except as set forth in the following claims.

This application is a division of application Serial No. 702,818, filed December 16, 1957, now U.S. Patent No. 3,078,262 granted February 19, 1963.

We claim:

1. A catalytically-active composition of matter comprising an amine, said amine being selected from the group consisting of pyridine and secondary aliphatic, aromatic and cycloaliphatic amines, and the reaction product prepared by admixing a transition metal salt and a Grignard reagent, said transition metal of said transition metal salt being selected from the group consisting of titanium and zirconium, said reaction product containing an organic moiety linked to said transition metal by a direct metal-to-carbon bond, and where said amine is present in amount between 0.05 and 2 gram-mols of amine for each gram-atom of said transition metal.

2. A catalytically-active composition of matter comprising an amine, said amine being selected from the group consisting of pyridine and secondary aliphatic, aromatic and cycloaliphatic amines, and the reaction product prepared by admixing a transition metal halide and a Grignard reagent, said transition metal of said transition metal halide being selected from the group consisting of titanium and zirconium, said reaction product containing an organic moiety linked to said transition metal by a direct metal-to-carbon bond, and where said amine is present in amount between 0.05 and 2 gram-mols of amine for each gram-atom of said transition metal.

3. A catalytically-active composition of matter comprising an amine, said amine being selected from the group consisting of pyridine and secondary aliphatic, aromatic and cycloaliphatic amines, and the reaction product prepared by admixing titanium tetrachloride and a Grignard reagent, said reaction product containing an organic moiety linked to said transition metal by a direct metal-to-carbon bond, and where said amine is present in amount between 0.05 and 2 gram-mols of amine for each gram-atom of titanium.

4. A catalytically-active composition of matter comprising an amine, said amine being selected from the group consisting of pyridine and secondary aliphatic, aromatic and cycloaliphatic amines, and the reaction product prepared by admixing zirconium tetrachloride and a Grignard reagent, said reaction product containing an organic moiety linked to said transition metal by a direct metal-to-carbon bond, and where said amine is present in amount between 0.05 and 2 gram-mols of amine for each gram-atom of zirconium.

5. A catalytically-active composition of matter comprising diphenylamine and the reaction product prepared by admixing a transition metal salt and a Grignard reagent, said transition metal of said transition metal salt being selected from the group consisting of titanium and zirconium, said reaction product containing an organic moiety linked to said transition metal by a direct metal-to-carbon bond, and where said diphenylamine is present in amount between 0.05 and 2 gram-mols of diphenylamine for each gram-atom of said transition metal.

6. A catalytically-active composition of matter comprising pyridine and the reaction product prepared by admixing a transition metal salt and a Grignard reagent, said transition metal of said transition metal salt being selected from the group consisting of titanium and zirconium, said reaction product containing an organic moiety linked to said transition metal by a direct metal-to-carbon bond, and where said pyridine is present in amount between 0.05 and 2 gram-mols of pyridine for each gram atom of said transition metal.

References Cited in the file of this patent

UNITED STATES PATENTS

| | | |
|---|---|---|
| 2,873,291 | Spiegler | Feb. 10, 1959 |
| 2,905,645 | Anderson et al. | Sept. 22, 1959 |
| 3,031,440 | Kaufman et al. | Apr. 24, 1962 |